United States Patent [19]
Barron et al.

[11] Patent Number: 5,238,711

[45] Date of Patent: * Aug. 24, 1993

[54] METHOD OF COATING CARBON FIBERS WITH A CARBIDE

[75] Inventors: Andrew R. Barron, Cambridge; Andrew N. MacInnes, Sommerville; Thomas R. Gilbert, Norfolk, all of Mass.

[73] Assignee: The President and Fellows of Harvard College, Cambridge, Mass.

[*] Notice: The portion of the term of this patent subsequent to Aug. 23, 2009 has been disclaimed.

[21] Appl. No.: 672,378

[22] Filed: Mar. 20, 1991

Related U.S. Application Data

[63] Continuation-in-part of Ser. No. 610,844, Nov. 5, 1990, abandoned.

[51] Int. Cl.$^5$ .............................................. B05D 3/02
[52] U.S. Cl. .................................. 427/228; 427/226; 427/314; 427/113; 427/545; 427/557
[58] Field of Search ............... 427/228, 314, 226, 113, 427/55, 545, 557; 428/367, 408

[56] References Cited

U.S. PATENT DOCUMENTS

| | | | |
|---|---|---|---|
| 3,342,627 | 9/1967 | Paxton et al. | 427/113 |
| 3,356,525 | 12/1967 | Gutzeit | 117/46 |
| 3,854,991 | 12/1974 | Hale | 117/169 R |
| 3,874,900 | 4/1975 | Post et al. | 117/69 |
| 3,901,663 | 8/1975 | Hofmann et al. | 29/195 |
| 3,903,347 | 9/1975 | Galasso et al. | 428/366 |
| 3,975,557 | 8/1976 | Kuchek | 427/126 |
| 4,080,508 | 3/1978 | Greenewald, Jr. | 13/7 |
| 4,104,417 | 8/1978 | Sara | 427/37 |
| 4,237,193 | 12/1980 | Jackson et al. | 428/678 |
| 4,252,856 | 2/1981 | Sara | 428/408 |
| 4,264,682 | 4/1981 | Fuyama et al. | 428/336 |
| 4,268,569 | 5/1981 | Hale | 428/215 |
| 4,275,095 | 6/1981 | Warren | 427/228 |
| 4,287,259 | 9/1981 | Riley | 428/408 |
| 4,343,836 | 8/1982 | Newkirk et al. | 427/249 |
| 4,347,083 | 8/1982 | Sara | 75/204 |
| 4,358,506 | 11/1982 | Intrater et al. | 428/408 |
| 4,396,677 | 8/1983 | Intrater | 428/408 |
| 4,397,901 | 8/1983 | Warren | 428/101 |
| 4,440,581 | 4/1984 | Baudis et al. | 148/6.11 |
| 4,446,169 | 5/1984 | Castle et al. | 427/53.1 |
| 4,453,987 | 6/1984 | Arai et al. | 148/15.5 |
| 4,471,023 | 9/1984 | Shuford | 428/408 |
| 4,500,602 | 2/1985 | Patten et al. | 428/408 |
| 4,560,589 | 12/1985 | Endou et al. | 427/249 |
| 4,585,675 | 4/1986 | Shuford | 427/376.2 |
| 4,594,294 | 6/1986 | Eichen et al. | 428/552 |
| 4,610,896 | 9/1986 | Veltri et al. | 427/140 |
| 4,657,825 | 4/1987 | Kanda et al. | 428/627 |
| 4,666,736 | 5/1987 | Matsumura et al. | 427/52 |
| 4,671,997 | 6/1987 | Galasso et al. | 428/408 |
| 4,686,156 | 8/1987 | Baldoni et al. | 428/698 |
| 4,726,099 | 2/1988 | Card et al. | 29/25 |
| 4,852,453 | 8/1989 | Morin | 89/1.11 |
| 4,889,686 | 12/1989 | Singh et al. | 419/13 |

FOREIGN PATENT DOCUMENTS

| | | | |
|---|---|---|---|
| 49-103848 | 10/1974 | Japan . | |
| 52-36585 | 3/1977 | Japan . | |
| 56-145180 | 10/1980 | Japan | 427/228 |

OTHER PUBLICATIONS

"Carbide-Treated Graphite Cuvettes for Electrothermal Atomization Prepared by Impregnation with Metal Chlorides," by Manuel C. Almeida, et al., Applied Spectroscopy, vol. 40, No. 1, pp. 4-8 1986.

*Primary Examiner*—Shrive Beck
*Assistant Examiner*—Roy V. King
*Attorney, Agent, or Firm*—Weingarten, Schurgin, Gagnebin & Hayes

[57] ABSTRACT

A method for rapidly providing an impervious carbon substrate such as carbon fibers with a carbide coating, in atmospheric pressure, so as to provide a carbide layer bound to the carbon substrate. A carbide layer on the impervious carbon substrate is provided by coating the substrate with a concentrated solution of a carbide forming element in compound dissolved in a suitable solvent. The carbon substrate is heated to a temperature at which the carbide forming element in compound decomposes and chemically reacts with the carbon substrate to form the desired carbide layer.

8 Claims, No Drawings

METHOD OF COATING CARBON FIBERS WITH A CARBIDE

The Government has rights in this invention pursuant to grant Number GC-A-969628 awarded by the Office of Naval Research.

RELATED APPLICATION

This is a continuation-in-part of U.S. application Ser. No. 610,844, filed on Nov. 5, 1990 now abandoned.

FIELD OF THE INVENTION

The present invention relates to coating carbide on substrates, particularly to a process for coating carbide on carbon fibers.

Advanced composites and other materials may be strengthened by incorporating reinforcing carbon fibers. The performance of the reinforcing carbon fibers may be further enhanced by providing a carbide coating to the carbon fiber substrate.

Carbide coatings on carbon substrates are typically prepared by chemical vapor deposition (CVD). Generally, halide vapors of the carbide forming element are thermally decomposed at the substrate surface and reacted with a gas mixture. The gas mixture typically contains a volatile compound of the carbide precursor, such as methane, which acts as the source of carbon for the carbide layer, hydrogen, and an inert carrier gas such as argon. CVD yields a complete layer of uniform thickness of carbide over the carbon, however, there is minimal binding between the carbide coating and the carbon substrate. Consequently, differences in coefficients of thermal expansion of the carbide and carbon may result in the carbide coating peeling away from the substrate when the coated substrate is repeatedly cycled between high and low temperatures.

Furthermore, chemical vapor deposition of carbide coatings on carbon substrates must be performed using expensive and elaborate equipment such as ovens or induction furnaces operated at reduced pressures.

Other methods are known for reacting carbide forming elements in solution with porous graphite materials so as to fill up the porous graphite structures with carbides to create an impervious carbide structure. Carbide-treated graphite cuvettes for use as spectroscopic graphite electrodes to electrothermally vaporize samples in atomic absorption spectrophotometry have been prepared by impregnating porous carbon with metal chlorides.

As described by Almeida and Seitz in Applied Spectroscopy, 40(1), 4-8, 1986, porous graphite was impregnated with metal chloride by immersing the porous graphite in liquid metal chlorides under vacuum. The metal chlorides were hydrolyzed by soaking the impregnated porous graphite in water. The hydrolyzed precursor was then dehydrated in an electrothermal atomizer to dry the metal hydroxide and then heated to form the carbide.

Such a process required the time consuming steps of hydrolyzing by soaking in water (for 24 hours) and heating (for 2 hours) to dehydrate the metal hydroxide. Further, such a process resulted in extensive oxide formation. Most notably, only porous substrates could be impregnated by such a process.

SUMMARY OF THE INVENTION

According to the present invention a carbide coating is provided on an impervious carbon substrate such as a tow of carbon fibers via a method providing for binding between the carbide coating and the carbon substrate. The carbide layer on the carbon substrate is provided by chemically reacting the substrate with a concentrated solution of the carbide forming element in compound dissolved in a suitable solvent. The carbon substrate is heated to a temperature at which the carbide forming element in compound decomposes and chemically reacts with the impervious carbon substrate to form the desired carbide layer.

In further accord with the present invention a simple method for coating the impervious carbon substrate with carbide is carried out rapidly in an inert gas at atmospheric pressure without expensive, elaborate gas tight ovens or induction furnaces.

Features of the invention include rapidly and inexpensively providing a carbide coating bound to an impervious carbon substrate. A carbide coated impervious carbon substrate results which is better suited for applications involving elevated temperatures because of reduced susceptibility to damage from thermal expansion and contraction. Still further, carbon substrates such as impervious carbon reinforcing fibers used in advanced composites, are coated rapidly and inexpensively.

DETAILED DESCRIPTION OF THE INVENTION

Typically, tows of carbon fibers may be used to reinforce or strengthen polymer-matrix, metal-matrix and ceramic-matrix advanced composites. The carbon fibers may require a chemically inert barrier between themselves and the surrounding matrix, therefore it is desirable to select a carbide forming element or metal which is suitable to the ultimate environment, as is known in the art.

A robust barrier of adhesive carbide layered on the carbon substrate can be effected by coating the substrate with a concentrated solution of a carbide forming element in compound dissolved in a suitable solvent such as methanol or ethanol. Other solvents, as known in the art, may be preferred depending on the carbide forming element to be admixed.

The quantity of carbide forming element comprising the carbide layer is controlled by adjusting the concentration of the carbide forming element solvent solution. The carbon substrate, carbon fiber tows or woven or nonwoven carbon felt, is usually immersed into or drawn through the metal carbide forming element in compound/solvent solution. However, depending on the viscosity of the element in compound/solvent solution, the carbon substrate may be "painted" with the solution. Following application of the solution containing the carbide forming element; the solvent is allowed to evaporate and the carbon substrate is heated by passing an electric current through the substrate, by leads attached at extreme ends. The substrate is heated in an inert atmosphere to a temperature at which the carbide forming element in compound decomposes and the carbide forming element chemically reacts with the carbon substrate. The reaction temperature to which the substrate must be heated depends upon the carbide forming element selected. The carbides that are formed may incorporate a part or all of the carbon substrate in their structure. Therefore, they are chemically bonded to the substrate.

The immersion/solvent evaporation/high temperature chemical reaction sequence resembles that used in sol-gel processes for coating substrates. However, in contrast to a sol-gel process, the high temperature chemical reaction for carbide coating carbon fibers according to the invention includes the carbon substrate as one of the reactants. One of ordinary skill in the art may appreciate that like a sol-gel process, the thickness of carbide layers could be controlled by operational parameters such as speed of withdrawal from the precursor solution, concentration, viscosity and surface tension of the solution, and the angle of withdrawal.

The following examples of forming carbide coatings of niobium, tantalum, titanium, tungsten, vanadium, hafnium and zirconium are provided for the purpose of illustration.

EXAMPLES

1. A solution of niobium pentachloride in 95% ethanol at a concentration of 0.25 gram/mL was prepared. A three-inch long by 3/16 inch wide tow (consisting of 2,000 five $\mu$m diameter fibers) of carbon fibers prepared from PAN-based precursor was mounted in the electrode holders of a high current source (9 amp maximum) of electrical power (Varian Instruments, Palo Alto, Calif., Model CRA-63 carbon rod atomizer). To make good electrical contact, custom mounts were fabricated from one-inch lengths of 3/16 inch diameter graphite rods. The rods were cut in half lengthwise. Each end of the tow was placed between two rod halves and then mounted in the cell and electrode holders of the power supply. A 25 $\mu$L aliquot of the niobium pentachloride solution was applied to the portion of the tow between the pair of graphite clamps. The temperature of this portion was raised to 400° C. over 20 seconds and then to 2200° C. in six seconds. Additional 25 $\mu$L aliquots were added and the heating cycle repeated three times.

2. A solution of vanadium pentachloride was prepared in 95% ethanol at a concentration of 0.25 g/mL. A three-inch long by 3/16 inch wide tow (consisting of 2,000 five-$\mu$m diameter fibers) of carbon fibers prepared from PAN-based precursor was mounted in the cell and electrode holders of the power supply described in Example 1 using the half-cylinder graphite clamps described in Example 1. A 25 $\mu$L aliquot of the vanadium pentachloride solution was applied to the portion of the tow between the pair of graphite clamps. The temperature of this portion was raised to 400° C. over 20 seconds and then to 2200° C. in six seconds. Additional 25 $\mu$L aliquots were added and the heating cycle repeated three times.

3. A solution of tungsten hexachloride was prepared in methanol at a concentration of 0.25 g/mL. A three-inch long by 3/16 inch wide tow (consisting of 2,000 five $\mu$m diameter fibers) of carbon fibers prepared from PAN-based precursor was mounted in the cell and electrode holders of the power supply described in Example 1 using the half-cylinder graphite clamps described in Example 1. A 25 $\mu$L aliquot of the tungsten hexachloride solution was applied to the portion of the tow between the pair of graphite clamps. The temperature of this portion was raised to 400° C. over 20 seconds and then to 2200° C. in six seconds. Additional 25 $\mu$L aliquots were added and the heating cycle repeated three times.

4. A solution of hafnium tetrachloride was prepared in methanol at a concentration of 0.25 g/mL. A three-inch long by 3/16 inch wide tow (consisting of 2,000 five $\mu$m diameter fibers) of carbon fibers prepared from PAN-based precursor was mounted in the cell and electrode holders of the power supply described in Example 1 using the half-cylinder graphite clamps described in Example 1. A 25 $\mu$L aliquot of the hafnium tetrachloride solution was applied to the portion of the tow between the pair of graphite clamps. The temperature of this portion was raised to 400° C. over 20 seconds and then to 2200° C. in six seconds. Additional 25 $\mu$L aliquots were added and the heating cycle repeated three times.

5. A solution of zirconium tetrachloride was prepared in 95% ethanol at a concentration of 0.25 g/mL. A three-inch long by 3/16 inch wide tow (consisting of 2,000 five $\mu$m diameter fibers) of carbon fibers prepared from PAN-based precursor was mounted in the cell and electrode holders of the power supply described in Example 1 using the half-cylinder graphite clamps described in Example 1. A 25 $\mu$L aliquot of the zirconium tetrachloride solution was applied to the portion of the tow between the pair of graphite clamps. The temperature of this portion was raised to 400° C. over 20 seconds and then to 2200° C. in six seconds. Additional 25 $\mu$L aliquots were added and the heating cycle repeated three times.

6. A solution of tantalum pentachloride was prepared in methanol at a concentration of 0.25 g/mL. A three-inch long by 3/16 inch wide tow (consisting of 2,000 five $\mu$m diameter fibers) of carbon fibers prepared from PAN-based precursor was mounted in the cell and electrode holders of the power supply described in Example 1 using the half-cylinder graphite clamps described in Example 1. A 25 $\mu$L aliquot of the tantalum pentachloride solution was applied to the portion of the tow between the pair of graphite clamps. The temperature of this portion was raised to 400° C. over 20 seconds and then to 2200° C. in six seconds. Additional 25 $\mu$L aliquots were added and the heating cycle repeated three times.

7. A solution of titanium trichloride was prepared in 95% ethanol at a concentration of 0.25 g/mL. A three-inch long by 3/16 inch wide tow (consisting of 2,000 five $\mu$m diameter fibers) of carbon fibers prepared from PAN-based precursor was mounted in the cell and electrode holders of the power supply described in Example 1 using the half-cylinder graphite clamps described in Example 1. A 25 $\mu$L aliquot of the titanium trichloride solution was applied to the portion of the two between the pair of graphite clamps. The temperature of this portion was raised to 400° C. over 20 seconds and then to 2200° C. in six seconds. Additional 25 $\mu$L aliquots were added and the heating cycle repeated three times.

Although concentrated solutions comprising salts forming carbides of the elements niobium, tantalum, titanium, tungsten, vanadium, hafnium and zirconium are discussed hereinbefore relative to the method of forming a carbide layer according to the invention, one of ordinary skill in the art will appreciate that other elements in compound may be used to form respective carbide layers.

Although the element in compound solutions discussed hereinbefore are dissolved in ethanol or methanol it can be appreciated by one of ordinary skill in the art that other suitable solvents may be used to dissolve the element in compound to form a carbide layer according to the invention.

While electrothermal heating of the carbon substrate is discussed, other means of localized heating of the carbon substrate to decompose the carbide forming element in compound thereon without the use of an induction furnace could be implemented, such as radiant heating.

Although the invention has been shown and described with respect to illustrative examples, thereof, it should be understood by those skilled in the art that the foregoing and various other changes, omissions and additions in the form and detail thereof may be made without departing from the spirit and scope of the invention as delineated in the claims.

What is claimed is:

1. A method of coating carbon fibers with a carbide, said method comprising the steps of:

selecting a carbon-free inorganic compound containing a carbide forming element;

dissolving said compound in a non-aqueous solvent;

depositing said solvent having said carbide forming element dissolved therein onto said carbon fibers;

heating said carbon fibers to a temperature at which said inorganic compound containing said carbide forming element decomposes and chemically reacts only with said carbon fibers to form a carbide surface layer thereon.

2. The method of claim 1 wherein said compound containing said carbide forming element is in the form of a metal salt.

3. The method of claim 1 wherein said carbide forming element is selected from the group consisting of niobium, tantalum, titanium, vanadium, hafnium and zirconium.

4. The method of claim 1 wherein said solvent is ethanol.

5. The method of claim 1 wherein said solvent is methanol.

6. The method of claim 1 wherein said step of heating is achieved by passing an electric current through said carbon fibers.

7. The method of claim 1 wherein said step of heating is achieved by radiant heating.

8. The method of claim 1 wherein the steps of dissolving, depositing and heating are carried out at atmospheric pressure.

* * * * *

UNITED STATES PATENT AND TRADEMARK OFFICE
CERTIFICATE OF CORRECTION

PATENT NO. : 5,238,711
DATED : August 24, 1993
INVENTOR(S) : Andrew R. Barron, et al.

It is certified that error appears in the above-identified patent and that said Letters Patent is hereby corrected as shown below:

Column 1, line 5, please delete "The Government has rights in this invention pursuant to grant Number GC-A-969628 awarded by the Office of Naval Research" and replace with
--This invention was made with Government support under Contract N00014-88-K-0450 awarded by the Department of the Navy. The Government has certain rights in the invention.--

Column 1, line 16, please insert --BACKGROUND OF THE INVENTION--.

Signed and Sealed this

Eighth Day of March, 1994

*Attest:*

BRUCE LEHMAN

*Attesting Officer*     *Commissioner of Patents and Trademarks*